Figure 1:
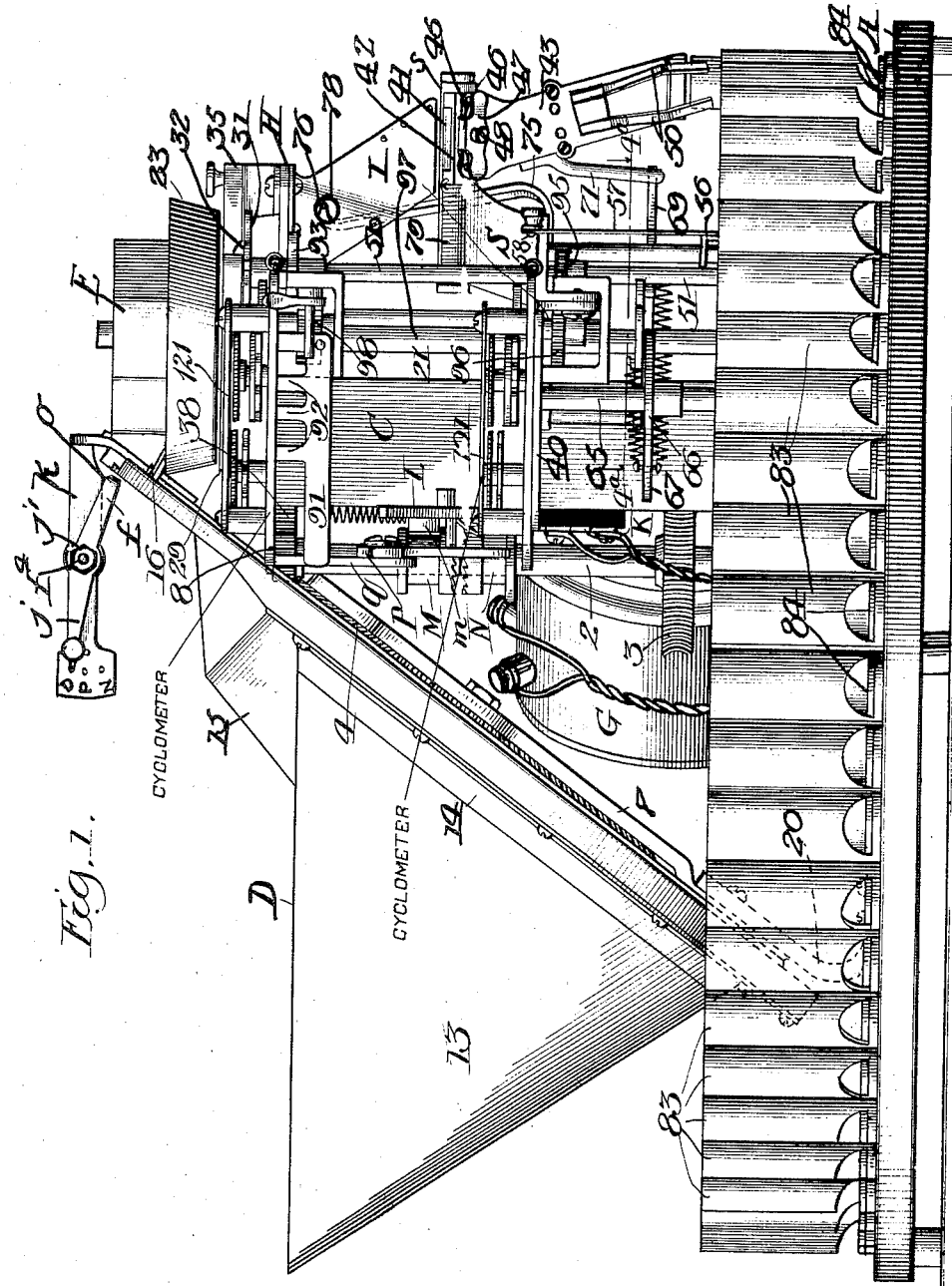

C. L. LILLEBERG.
COIN COUNTING AND SELECTING MACHINE.
APPLICATION FILED APR. 4, 1908.

1,049,500.

Patented Jan. 7, 1913.

9 SHEETS—SHEET 2.

Witnesses

Inventor
Charles L. Lilleberg
by Frank D. Thomason
Atty

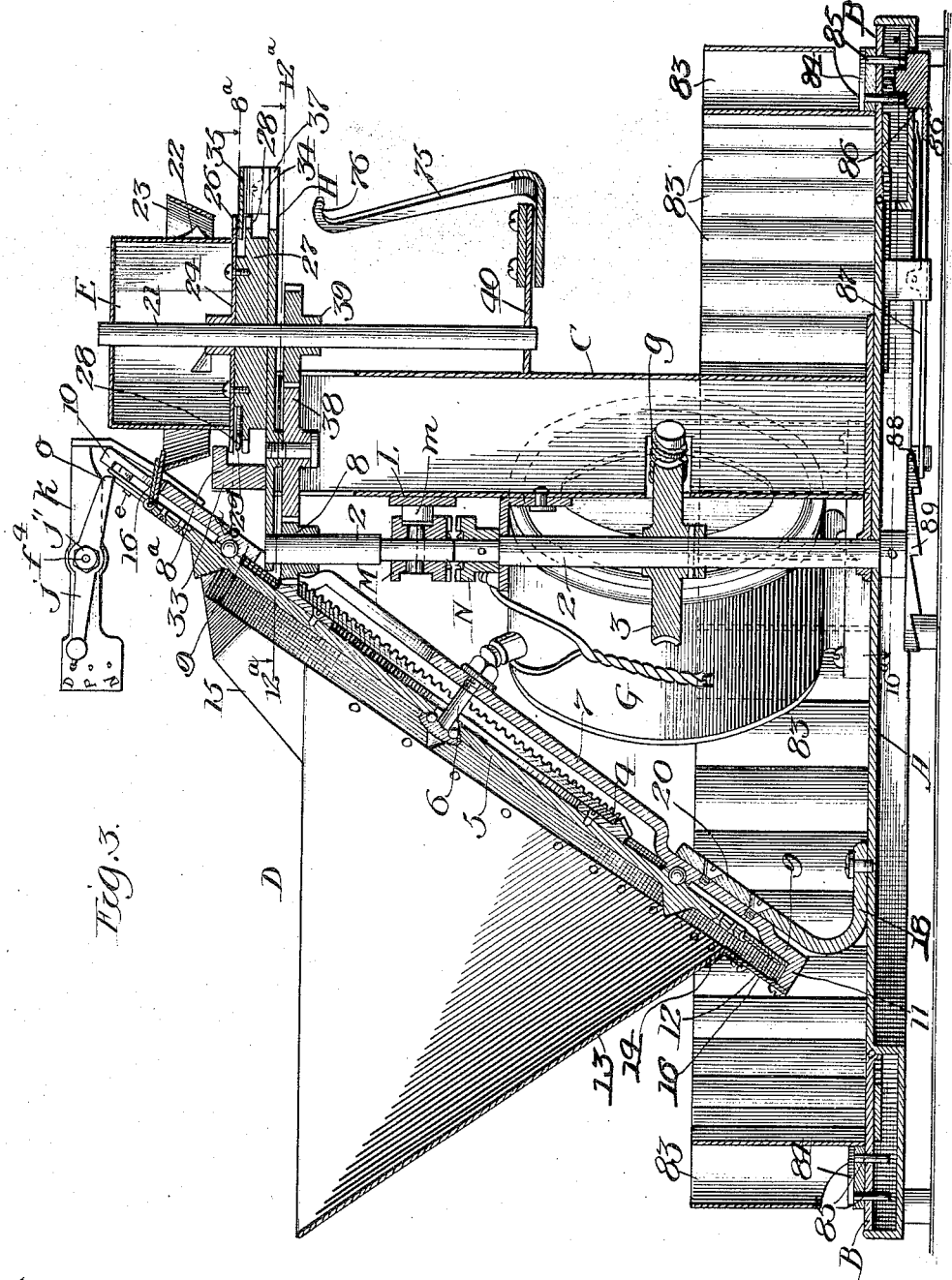

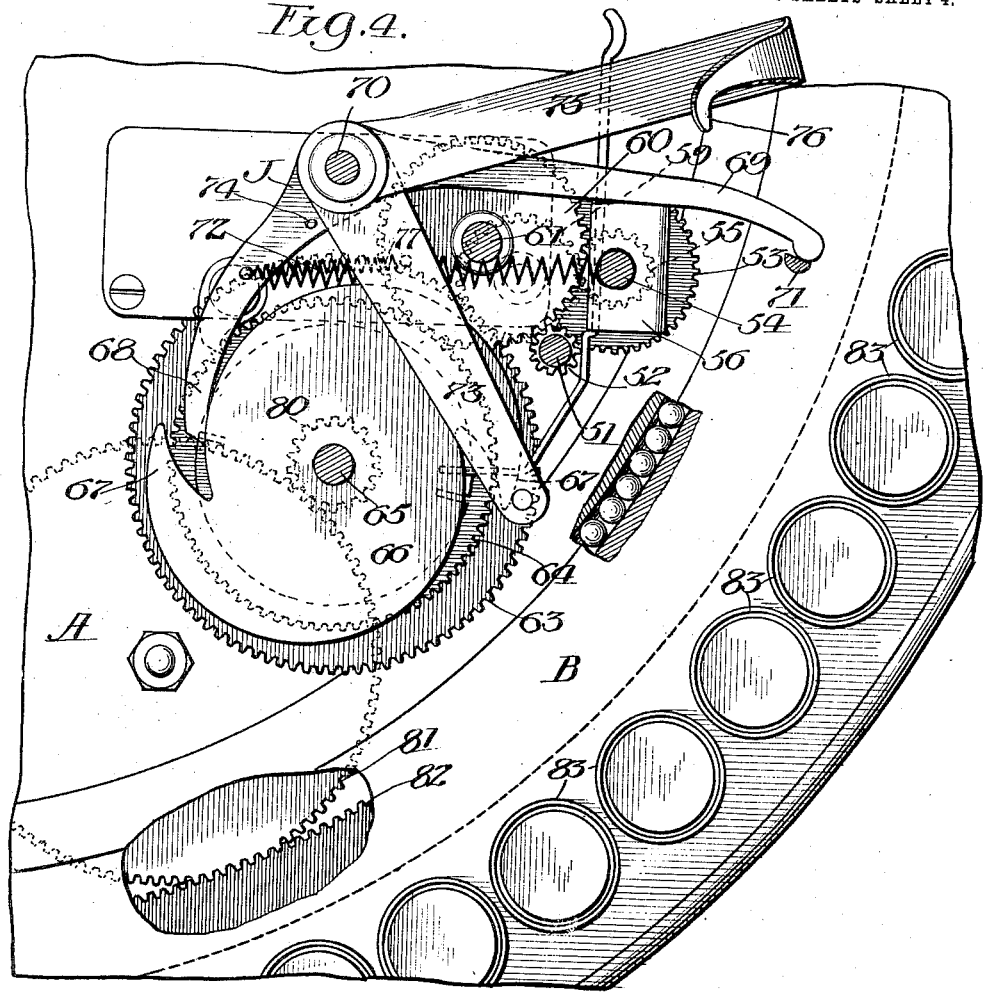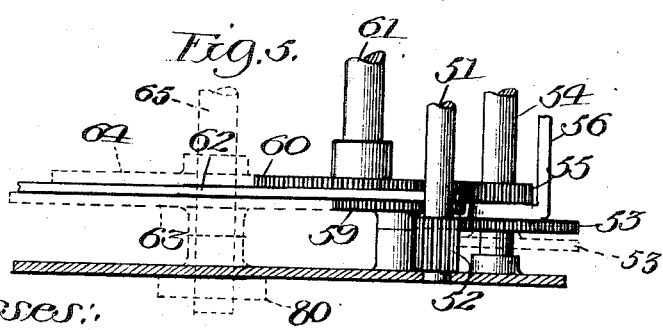

C. L. LILLEBERG.
COIN COUNTING AND SELECTING MACHINE.
APPLICATION FILED APR. 4, 1908.

1,049,500.

Patented Jan. 7, 1913.
9 SHEETS—SHEET 5.

C. L. LILLEBERG.
COIN COUNTING AND SELECTING MACHINE.
APPLICATION FILED APR. 4, 1908.

1,049,500.

Patented Jan. 7, 1913.
9 SHEETS—SHEET 6.

Witnesses
Inventor
Charles L. Lilleberg

C. L. LILLEBERG.
COIN COUNTING AND SELECTING MACHINE.
APPLICATION FILED APR. 4, 1908.
1,049,500.
Patented Jan. 7, 1913.
9 SHEETS—SHEET 7.
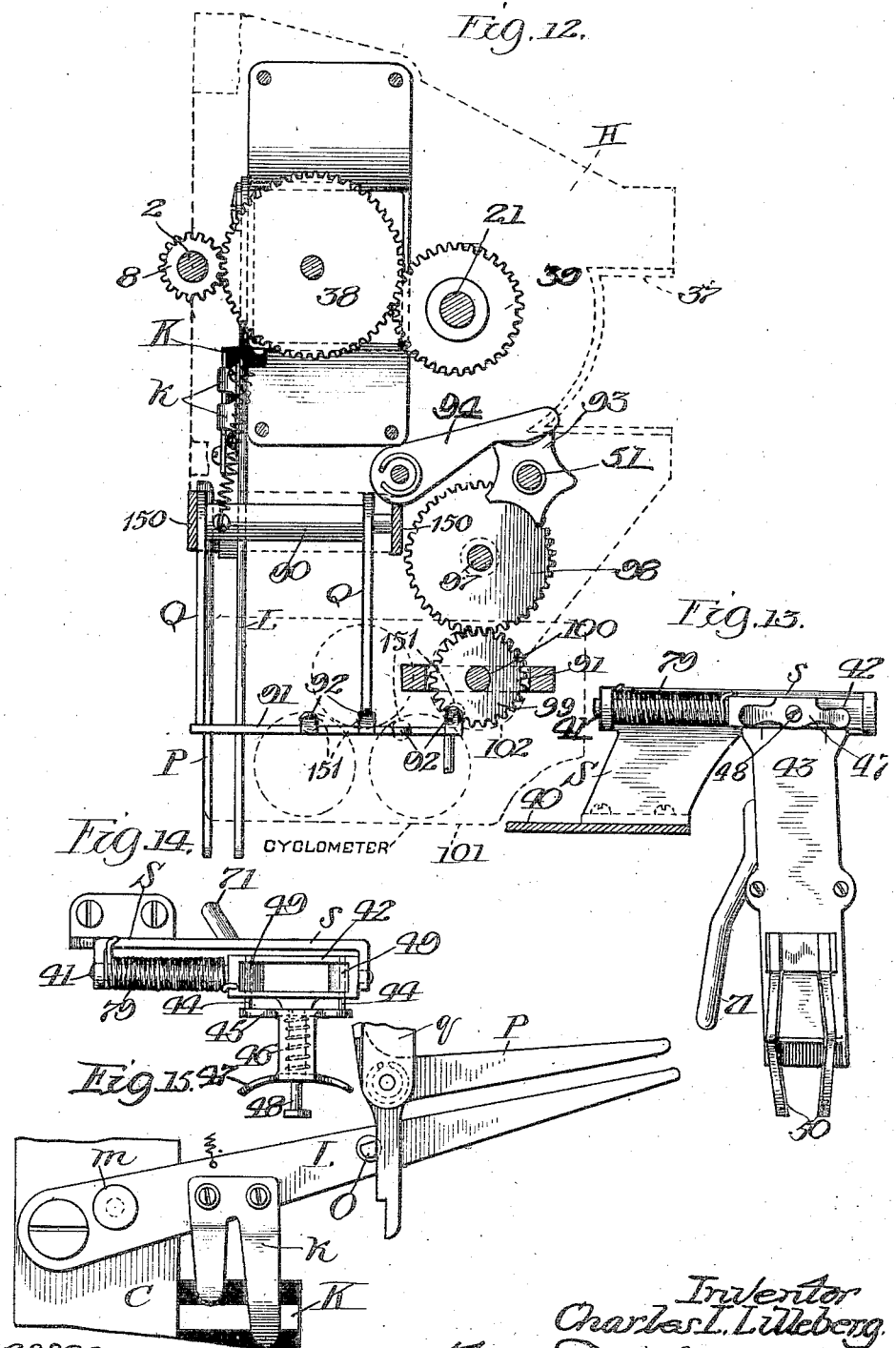

C. L. LILLEBERG.
COIN COUNTING AND SELECTING MACHINE.
APPLICATION FILED APR. 4, 1908.
1,049,500.
Patented Jan. 7, 1913.
9 SHEETS—SHEET 8.
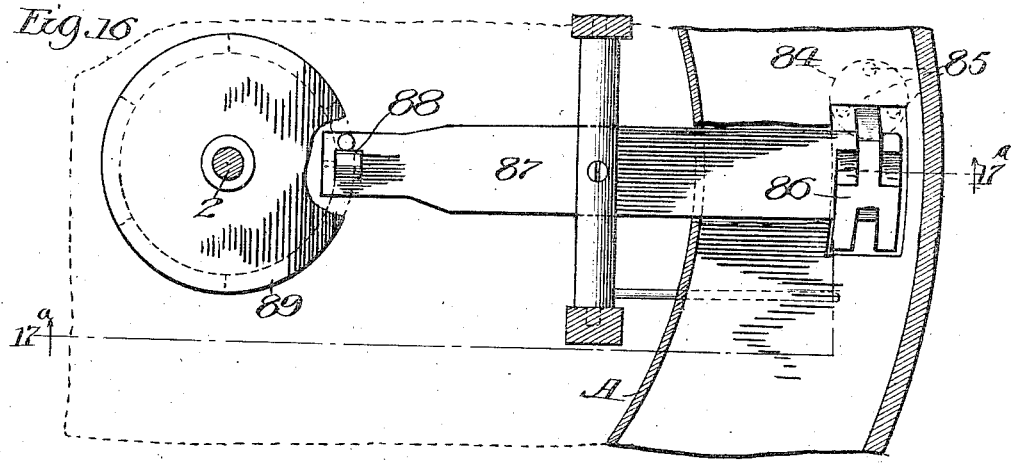
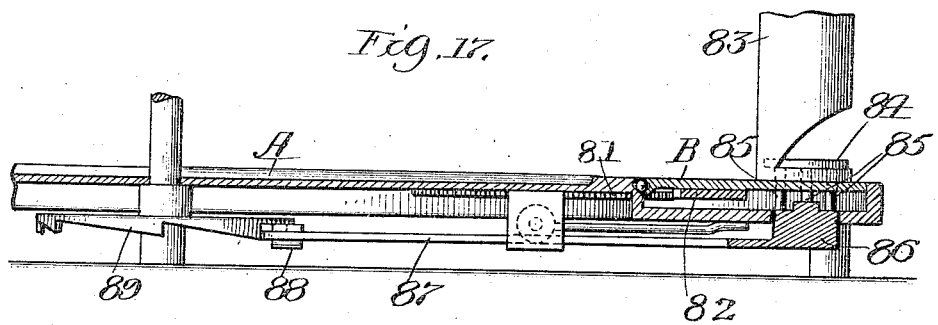
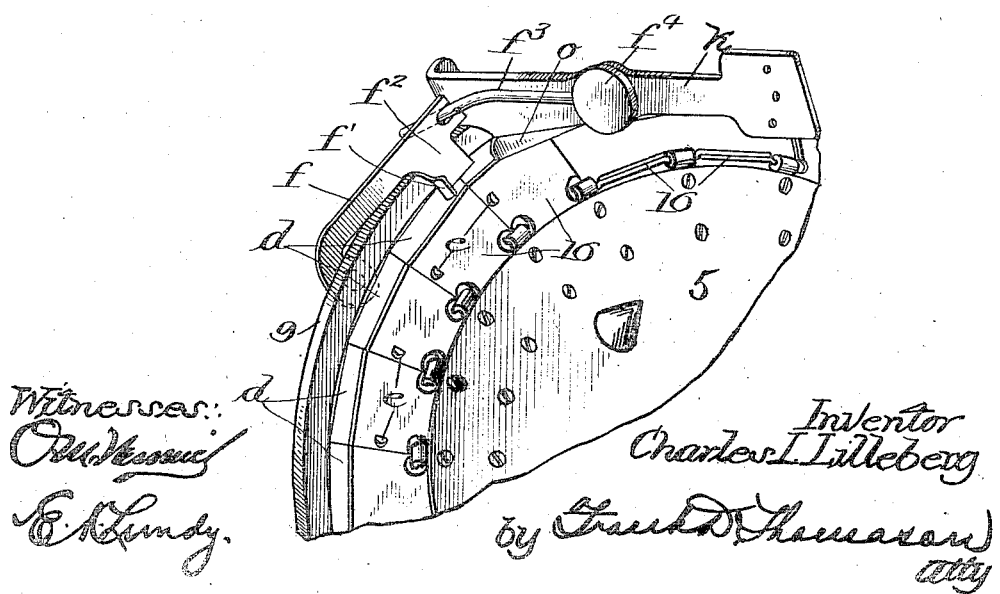
Inventor
Charles L. Lilleberg

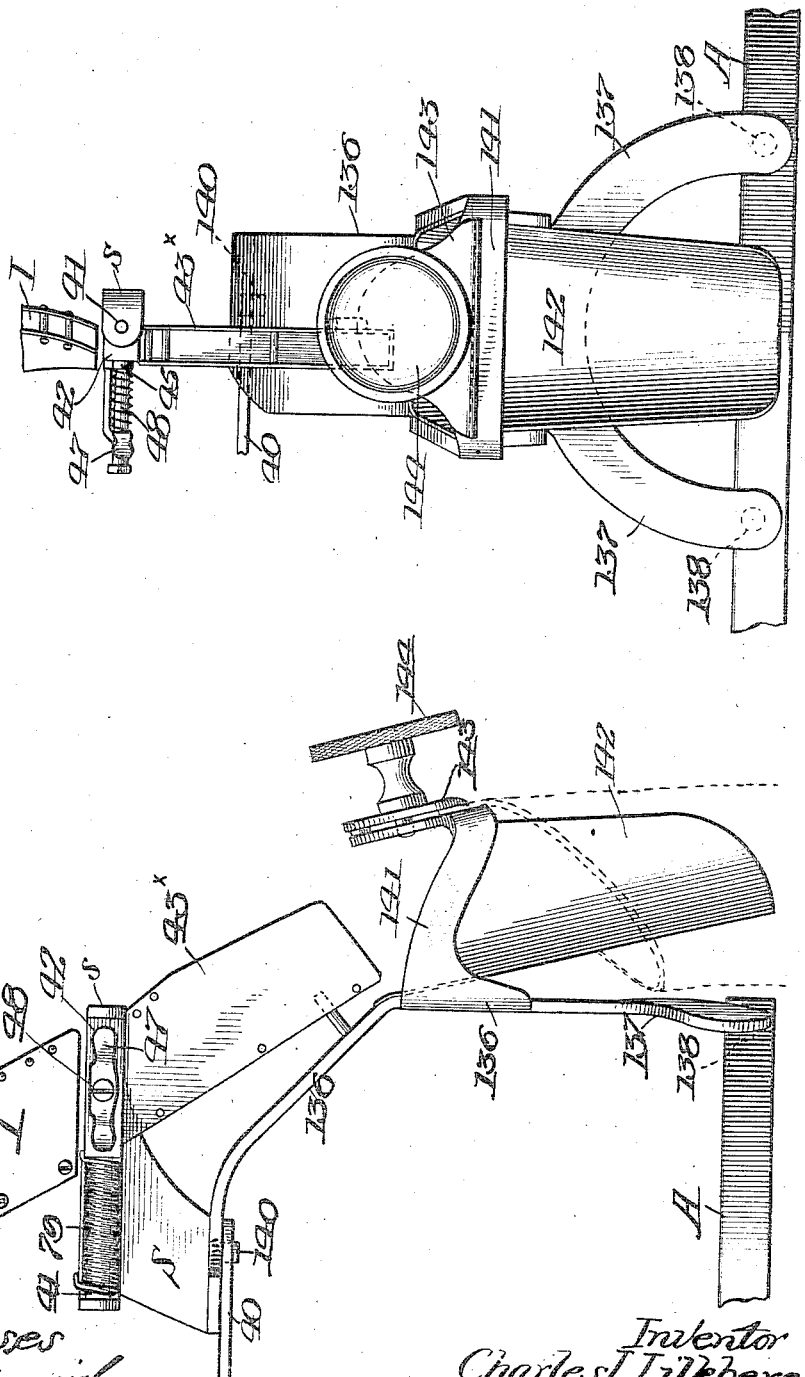

UNITED STATES PATENT OFFICE.

CHARLES L. LILLEBERG, OF CHICAGO, ILLINOIS, ASSIGNOR TO JOHN B. MALLERS, JR., OF CHICAGO, ILLINOIS.

COIN COUNTING AND SELECTING MACHINE.

1,049,500.        Specification of Letters Patent.        Patented Jan. 7, 1913.

Application filed April 4, 1906. Serial No. 425,216.

*To all whom it may concern:*

Be it known that I, CHARLES L. LILLEBERG, a citizen of the United States, and a resident of Chicago, in the county of Cook and State of Illinois, have invented certain new and useful Improvements in Coin Counting and Selecting Machines, of which the following is a clear, full, and exact description.

The object of my invention is to provide a coin counting and packaging machine, which is adapted to receive a large quantity of coins, separate them one by one from the mass, and carry them in single order past a cyclometer mechanism which they actuate in transit, and finally deposit said coins in cartons.

It is a further object of my invention to set the machine so that it will automatically stop when a predetermined number of coins have been counted, and which will show just the number of coins that have been counted and the number remaining to be counted, at any time during the process of counting said predetermined number.

It is also an important object of my invention to provide automatic mechanism that insures the depositing in each carton a given number of coins during the processional movement of said cartons in transit past the point where the coins are received thereby.

It is also another object of my invention to slightly halt the flow of coins falling into the cartons, when the latter have received the predetermined number of the same, to afford the cartons a chance to pass from under the devices guiding the falling coins, and the next carton to be brought into position to receive the same, and also to keep the carton vibrating up and down during the time it is receiving coins, so as to properly stack and pack the same.

These and other objects it accomplishes quickly, and accurately, and continuously for as long a period of time as desired, much better than can be done by human agencies; substantially as hereinafter fully described, and as particularly pointed out in the claims.

Figure 2:
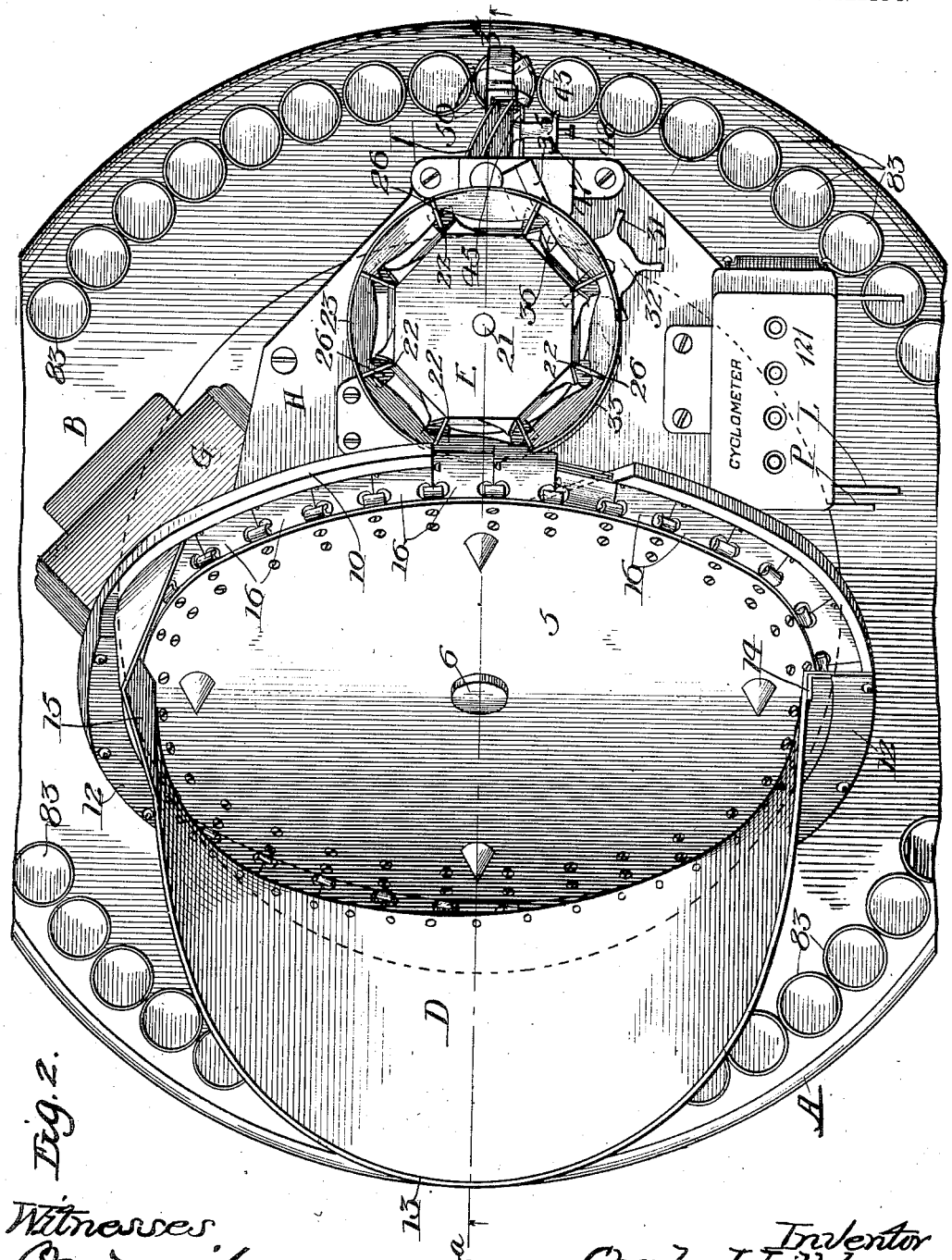
Figure 6:
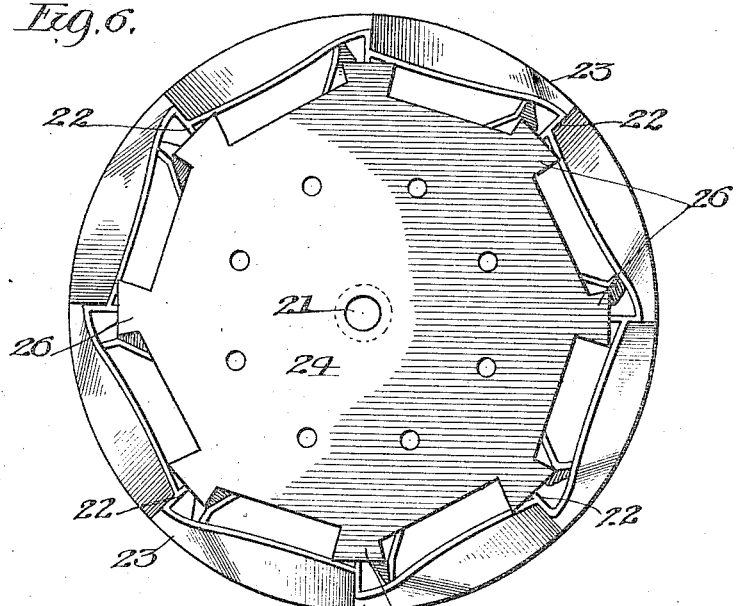
Figure 7:
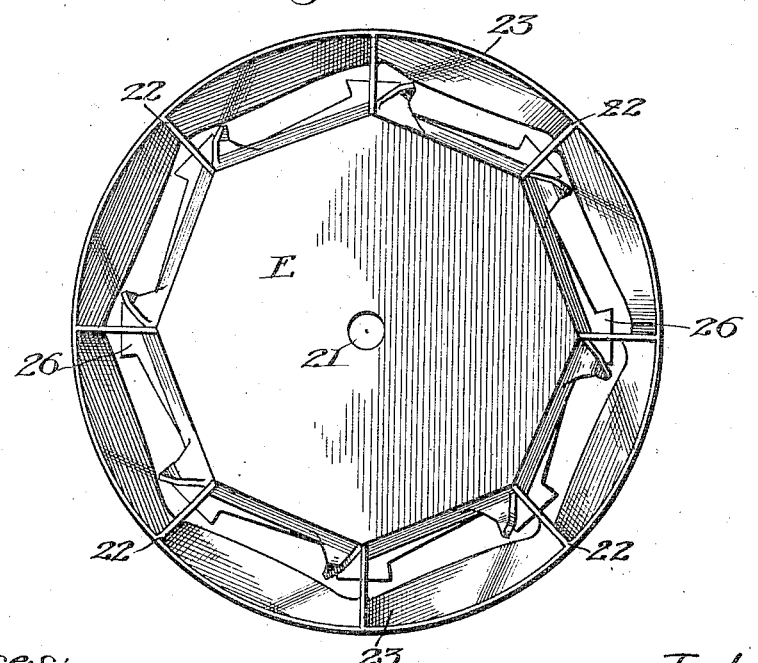
Figure 8:
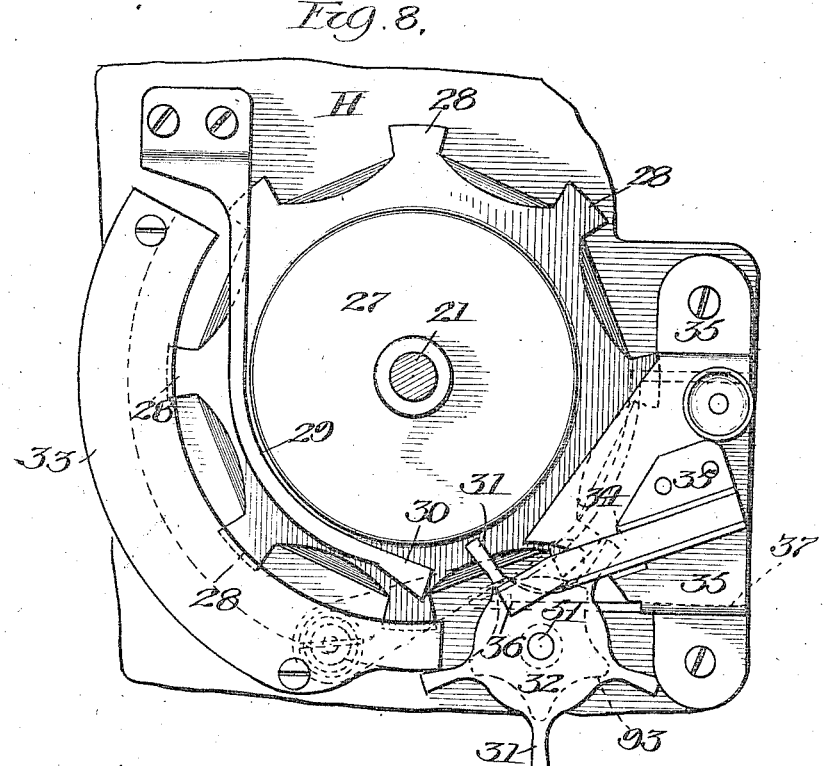
Figure 9:
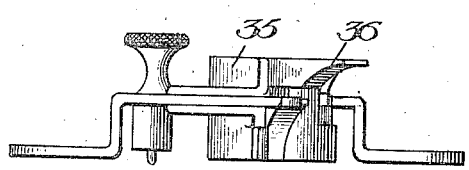
Figure 11:
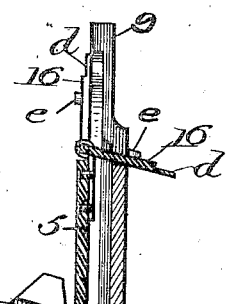
Figure 10:
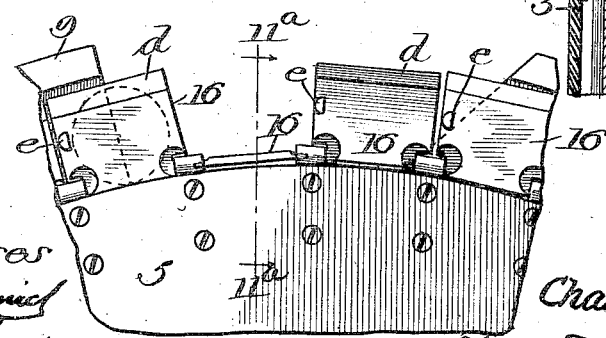

In the drawings:—Figure 1 is a side elevation of my invention. Fig. 2 is a plan view of the same with portions of the basal structure broken away. Fig. 3 is a vertical central section taken on dotted line 3ª, 3ª, Fig. 2. Fig. 4 is a horizontal section taken on dotted line 4ª, 4ª, Fig. 1. Fig. 5 is a detail view showing in elevation the lower gearing for engaging the mechanism shown in Fig. 4. Fig. 6 is a plan view of the underside of the hopper removed from the machine and drawn to an enlarged scale. Fig. 7 is a plan view of the top of said hopper. Fig. 8 is a horizontal section showing the revolving support for the hopper, taken on dotted line 8ª, Fig. 3, and drawn to a larger scale. Fig. 9 is a detail view of the housing over the opening in the upper platform, down through which the coins fall into the coin-chute. Fig. 10 is a front view of the broken away upper portion of the revolving bottom of the magazine. Fig. 11 is a vertical section taken on dotted line 11ª, 11ª, Fig. 10. Fig. 12 is a horizontal section taken on dotted line 12ª, 12ª, Fig. 3, with the magazine omitted, and drawn to a larger scale. Fig. 13 is a detail view showing a side elevation of the lower section of the coin discharge chute and its support. Fig. 14 is a plan view of the same. Fig. 15 is a side elevation of the electric switch mechanism broken away from the machine and drawn to a larger scale. Fig. 16 is a horizontal section taken on dotted line 16ª, 16ª, Fig. 3, drawn to a larger scale. Fig. 17 is a vertical section taken on dotted line 17ª, 17ª, Fig. 16 including the base-plate. Fig. 18 is a perspective view of a fragment of the upper segment of the magazine, illustrating the coin rejecting devices of the magazine. Figs. 19 and 20 show side and front elevations, respectively, of a bag filling mechanism and holder used in connection with my improved machine.

Generally speaking my invention consists of a suitable base A which may be circular or otherwise and is provided with a concentric revolving annulus B, and with a suitable standard C arising therefrom, and an inclined magazine D. This magazine is so constructed that coin deposited therein are carried on the marginal portion of its revolving bottom to about the highest point reached by the same, and then deposited, one by one, into a pocket of a revolving hopper E, by means of which they are carried past and operate the actuating mechanism of two cyclometers and are finally dropped into a suitable chute whereby they are conveyed to and dropped into cartons arranged in a circle on and concentric to the revolving annulus hereinbefore referred to.

The standard C is provided, on the side thereof nearest the center of the base, with horizontally projecting brackets that afford bearings for the upper and lower section of the vertical drive-shaft 2 of the machine; the lower section of which latter is provided with a worm-gear 3, that is engaged by a worm $g$, on the armature shaft of a suitable motor G, secured to said base. The upper section of the drive-shaft is driven by the lower section through the medium of a suitable clutch, consisting of a lower clutch member N secured fast to the upper end of the lower section, and a sliding member M on the lower end of the upper section of the drive-shaft, as will hereinafter more fully appear. The upper end of this upper section of said shaft, just below a platform H secured to the upper end of the standard, is provided with a pinion 8 that engages a beveled gear 4 secured concentrically to the underside of the revolving bottom 5 of the magazine, which latter is journaled on a pivotal stud 6 projecting from the point of convergence of the three equidistant arms of a spider 7, whose outer ends are made integral with or are secured to a suitable rim 9, the diameter of which exceeds the total diameter of the revolving bottom of the magazine and has its circumferential edges flanged in a direction away from the standard. The lower portion 11, say about two-thirds, of said flange projects about three times the extent of the upper portion 10 thereof and has the outer margins of a segmental plate 12 suitably secured to its edge so as to overhang the sectional margins of the revolving bottom 5 of the magazine, to which segmental plate the scoop-shaped walls 13 of the magazine is secured by means of an angle-strip 14. The wall 13 forms, in conjunction with the bottom of the magazine, a receptacle into which the coins to be counted are deposited, and it is so constructed as to incline toward an imaginary apex in alinement with the axis of the bottom of the hopper. The edge of the right-hand portion of the hopper, next the revolving bottom 5 extends beyond the edge of the segmental plate 12, and comes so close to it as to almost touch bottom 5, and continues in such close relation until a point is reached, which is to the right of the vertical plane of the axis of the pivotal stud 6, whereupon said edge of the wall begins to recede from the bottom of the magazine until it is removed therefrom a distance corresponding to that separating the segmental plate from the same, at which distance it then remains until the upper left hand edge thereof is reached. If desired this left-hand upper edge of the wall 13 may be provided with an extension 15, which is deflected upward and follows the curvature of and is connected to flange 10 for a short distance.

The marginal edges of the bottom, 5, of the magazine comprise a series of about forty corresponding trays 16, whose inner edges are hinged to the plate forming the center of the bottom by means of straps secured to the underside of the same, as shown. The outer edges of these trays describe a circle, which comes just within the inner circumference of the flange 10—11 of the rim, which latter, at the point just to the left of the vertical plane of the axis of the bottom, is cut away a distance slightly exceeding the distance between the inner and outer circumferential edges of the trays, and leaves a recess extending in a curved direction struck from the center of the magazine, to a point removed from said radial edge about twice the width of said trays, whereupon it gradually inclines out to the outer circumference of the rim 9 again. Rim 9 is supported by means of an angular foot 18, which is secured to the base A, and is bent upward to form a lug 20 to which the lower edge of the rim 9 is secured.

The platform H extends a suitable distance beyond the side of the standard C, opposite the magazine, and is provided with suitable bearings for a vertical shaft 21, whose upper end extends above said bearings and has the hopper E secured thereto. This hopper comprises a hollow polygonal shaped box which has, at the angles of its sides, outwardly projecting partitions 22 that connect and support a polygonal outward rim 23. This polygonal rim is inclined from its upper edge toward the hollow polygonal box and forms suitable pockets or hoppers that are open both at the top and bottom, but have their lower openings comparatively narrow and their upper openings comparatively wide. The diameter of this revolving series of hoppers is such that they are successively carried past and immediately back of the upper recessed edge of the rim 9 of the stationary back of the magazine, and as the bottom of the hopper revolves the trays successively fall backward as they come opposite the upper recessed edge of said rim, and receive the coins carried by said trays. The sides of the hopper extend below the pockets and have a bottom-plate 24 secured to its lower edge, which, in the vertical plane of the partitions 22, is provided with radial dovetail projections 26. Hopper E is secured to a comparatively thick boss 27 by means of screws tapped through plate 24 and said boss is secured to shaft 21.

Just below plate 24, boss 27 is reduced in diameter, and, just below this reduced portion, it is provided with a circumferential flange, which is provided with projections 28, corresponding in position, shape, and dimensions to projections 26. This construction results in producing an annular groove between plate 24 and boss 27, in which a segmental arm 29, extends. The end of this arm nearest the magazine is bent downward and secured to plate H, and the remainder of its length extends in said groove a distance corresponding to a little less than one-half the circumference of the said plates, whereupon the outer edge of its extremity 30 is deflected outward to throw the coins, which are falling into the hopper and rolled around on edge on the platform H between the projections 26 and 28, into engagement with radiating fingers 31 of a spur-wheel 32, and revolving the same. The coins which fall into the pockets of the hopper are kept rolling on edge by means of a segmental inverted L-shaped guard 33, secured to platform H and extending from a point adjacent to the stationary back of the magazine, outside of the periphery described by the projections 26 and 28, to the spur-wheel, whereupon its vertical portion terminates, but its upper horizontal portion extends over the spur-wheel a suitable distance. After the coin leaves the spur-wheel 32, it enters a passage 34 in a metal casing 35, constructed mostly of plate metal and screwed or otherwise secured to the edge of the platform H, opposite the magazine. The top edge of casing 35 in which passage 34 is made extends over the path of the coin as it passes the spur-wheel and forms an edge 36 that engages the top of said coin, and strips the dirt from the edge of the same as well as depress it into and through the slot 37 in the platform. From this slot the coin falls into a chute I, comprising two parallel plates the upper ends of which are flanged and secured to the underside of the platform, and are suitably spaced apart by edge strips placed between their outwardly inclined longitudinal edges.

The hopper-shaft 21 is engaged by means of an idle gear 38, which latter derives motion through the pinion 8 on the upper end of the drive-shaft, and imparts its motion to a gear 39 on the shaft 21, immediately below the platform H, and said hopper-shaft extends down to and has its lower end journaled in suitable bearings in a secondary platform 40, which latter consists of a horizontal-plate secured to and projecting from the standard C about midway its height. This platform 40 has a standard or boss S secured to and arising from the same, back of the chute I, whose upper end is provided with an outward extension s, that is parallel to and below the lower edge of chute I, and is provided with bearing-lugs for a rock-shaft 41. The outer portion of rock-shaft 41 extends immediately under the lower open end of said chute, and consists of an open rectangular frame 42, into which the upper end of a suspended spring chute 43 is secured, by means of pins 44 projecting from the ends of a cross-bar 45, which latter forms one end of a head 46, whose other end is provided with a cross-bar 47 bent to provide a finger-grasp. This head and its cross-bar is, preferably, made of an I-shaped strip of sheet metal with its cross-bars bent at right angles to the connecting member of the head, and provided with center openings for the passage of a stud 48 projecting at right angles from the center of length of the open rectangular frame portion of the rock-shaft 41. The outer portion of this stud 48 is greater in diameter than the remainder of its length, and has a coil expansion-spring surrounding it between its outer shoulder and cross-bar 45, thus keeping pins 44, that extend through suitable openings in the adjacent longitudinal side of frame 42, into engagement with openings in the outwardly projecting lugs 49 of chute 43.

Chute 43 consists of a tube, rectangular in cross-section, and with a bore of such dimensions as to permit the coin to fall edgewise therethrough. This chute extends down to and terminates just about the top of the paper cartons, which are placed in tubular holders secured to and arising from the revolving annulus B. The lower end of this chute, 43, is, preferably, curved slightly sidewise in the direction of the rotation of the annulus and provided with two or more flat spring-arms, 50, 50, the upper ends of which are permanently secured to a suitable piece of metal attached to the side of the chute, and the lower ends of which extend below the lower end of the chute and are bent so as to bear against the upper end of the carton and assist in directing the falling coin into the mouth of the same.

Spur-wheel 32 is secured to the upper end of a vertical shaft 51, and is only actuated when a coin engages said spur-wheel. This shaft 51 extends down through suitable bearings in platform H, platform 40, and the base-plate, and near said base-plate has an elongated pinion 52, which latter engages and drives a gear 53 on the lower end of a vertical shaft 54, whose ends are journaled in the base-plate and the secondary platform 40. Gear 53 is provided with an upwardly extending boss, the upper end of which has a pinion 55 made integral therewith, and said gear and pinion are splined to said shaft, so as to have a limited vertical movement thereon but revolve therewith, and gear 53 and pinion 55 are shifted longitudinally on the shaft 54 by means of a frame 56, the lower bend of which is much smaller than its upper bend. The lower extremity of frame 56 is bifurcated, and passes to each side of the shaft between pinion 55 and gear 53, and the horizontal portion of said frame, immediately above its extremity passes above the pinion, thus by lifting frame 56 the pinion 55 can be shifted longitudinally on said shaft 54. This shifting I prefer to accomplish by means of a vertical-blade 57, secured to the lower bend and the upper end of frame 56 in any suitable manner, and having its upper flexible portion extended beyond the secondary platform 40, and provided with a suitable handle at its upper end, which is secured thereto by means of a screw 58 the head of which projects toward shaft 54. By pulling the flexible upper portion of plate 57 out toward the chute, sufficient to enable the head of screw 58 to clear the edge of platform 40, the shifting frame 56 can be moved downward so as to move the pinion 55 into engagement with an idle-gear 59, journaled on a suitable stud projecting up from the base A. When said shifting-frame is at the limit of its downward movement the head of the screw 58 will catch under the edge of the secondary platform and hold said shifting-frame at the limit of its downward movement, and when said shifting-frame has been moved to the limit of its upward movement the head of the screw 58 will engage the upper edge of said secondary platform and hold said frame and pinion at the limit of its upward movement. When said pinion 55 has been thus moved to the limit of its upward movement it engages an idle-gear 60 secured on the lower end of an idle-shaft 61, the upper end of which latter is journaled in the secondary platform and the lower end in a plate 62 supported by posts arising from the base-plate. Idle-gear 59 is less in diameter than idle-gear 60 and it engages a gear 63 while idle-gear 60 engages a gear 64. Gear 64 is less in diameter than gear 63, and this train of pinions and gears, 55, 59, 60, 63 and 64 are so proportioned, that it will require fifty coins to pass the spur-wheel 32 in order to cause pinion 55 to revolve gear 63, through the medium of the idle-gear 59, one complete revolution, or it will require forty coins to pass the spur-wheel and cause pinion 55, through the medium of the idle-gear 60, to revolve the gear 64 one complete revolution. Gears 63 and 64 are secured to the same shaft 65, at a suitable point. Between gear 64 and the secondary platform I provide shaft 65 with a cam 66, the engaging edge of which is provided with two diametrically opposite spurs 67, 67, from the base of the inner edge of each of which to the apex of the other the edge of the cam is curved so as to give said edge a gradually increasing radius from the center of the cam. The edge of this cam is engaged, adjacent to the magazine, by a curved shorter branch 68 of a lever J. This lever is fulcrumed on a vertical rod 70 connecting the plate 62 and the secondary-platform, and the extremity of its longer branch 69 extends toward and is engaged by an arm 71 projecting inward and downward from chute 43. The shorter branch 68 of this lever is kept in engagement with the edge of the cam 66 by means of a coil contraction-spring 72 connecting said branch to spur-wheel shaft 54.

Immediately above lever J an arm 73 is loosely pivoted to stationary shaft 70, and this arm is connected to branch 68 of said lever by a coil-spring 77, but its movement toward the same is limited by a pin 74 projecting upward from branch 68 near the fulcrum of the lever. Arm 73 is provided with a boss which, preferably, extends upward as far as the underside of the secondary platform, and is there provided with an arm 75, that extends horizontally out beyond the edge of said secondary platform nearest the chute, and then upward to a point near platform H, whereupon its extremity 76 is turned toward chute I. When said cam shall have revolved to such position that the extremity of arm 73 will ride over the point of one of the spurs 67 of the cam, and, by reason of the action of the coil-spring 77, have a limited movement toward the center of the cam until said extremity engages the curved edge of the cam again, adjacent to the base of the spur 67, the extremity 76 of arm 75 will move toward the base through openings 78 in the upper portion of the upper chute I, as shown. As the cam continues to revolve, after causing this movement of arms 73 and 75, the extremity of the shorter branch 68 of the lever will ride over the point of the opposite spur 67 of the cam and quickly move toward the center of the cam, and, as the contraction-spring 72 is stronger than the coil-spring 77 a movement of lever J will be caused which, through the medium of the stop-pin 74, will move arm 73 back to its original position and arm 75 with it. When the upper extremity of arm 76 enters the openings 78 in the upper end of the chute I, it stops the downward movement of two or three coins long enough to permit the lower end of the spring-chute 43 to ride over and escape past the top of the carton into which it has been depositing coins, and engage and direct the falling coin into the next following carton. The longer branch of lever J will, through the medium of the downwardly projecting arm 71 of the chute 43, cause said chute to swing in the direction of the movement of the annulus B and keep pace with the carton until the desired number of coins have been deposited in the same, whereupon, as the lever is permitted to resume its original position, by reason of its shorter branch 68 moving past the spur, the coil contraction spring 72 will release the swinging chute 43 and permit the same, by reason of the action of the coil spring 79 on rock-shaft 41 upon the open rectangular frame thereof, to brush past the top of the carton it has been loading into engagement with the next empty carton.

Shaft 65 extends down through the base A and has a pinion 80 on its lower end, that engages a comparatively large idle gear 81 journaled on a suitable stud projecting down from the underside of the base, which latter engages the internal gear 82 cut in the inner circumference of annulus B. This whole train of gears, commencing with the spur-wheel 32, and terminating with the internal gear 82, is actuated, only according to the passage of coins past the spur-wheel, and the dimensions of pinion 80, and idle gear 81 are such that the annulus will be moved only the distance sufficient to allow the desired number of coins to be deposited in each carton, as they are fed into said carton by swinging chute 43, which latter, as hereinbefore fully explained, keeps pace with the movement of the annulus for a limited distance.

The cartons are placed in a circular series of tubular holders 83 secured to said annulus, and these cartons are of such dimensions that the open top edge bears against the flat spring arms 50. Said holders have a false-bottom 84 of about the same diameter, secured by pins 85 which extend through openings in said annulus, and which are engaged by a shoe 86, which causes the false-bottom to correspondingly vibrate vertically, so as to jolt the cartons contained in the same and make the coins therein settle level and compact. This shoe is secured to the outer edges of a radially disposed rocking-beam 87, which is fulcrumed about midway its length in suitable bearings projecting downward from the end of the base, and has its inner edge provided with an anti-friction roller 88 which engages the teeth of a crown ratchet 89 secured on the lower end of the drive-shaft 2.

The current is thrown on or off to the motor G by means of a switch K of suitable construction, which is secured to the edge of the secondary platform next standard C and faces the magazine. The brush $k$ for this switch is secured to and extends down from a lever L, which is fulcrumed at one end to the standard, and through the medium of an anti-friction roller or boss $m$, carried thereby, engages the circumferential groove in the upper sliding clutch member M of the clutch and throw the same into or out of engagement with the lower member of said clutch to transmit the motion of the lower section of the drive-shaft to, or move it out of engagement with the upper section. About midway the length of this lever it is provided with a laterally projecting stud O, which is engaged by the lower end of the vertical member of an L-shaped trip-lever P, which latter is fulcrumed to a lug $q$, depending from a frame Q, that automatically moves upward and releases the clutch and lever L, when a certain predetermined number of coins have been counted by the cyclometer used in connection with my invention.

Referring to Fig. 12, this frame Q consists of two arms or side-strips which are secured at one end to a horizontal rock-shaft 90 the ends of which are journaled in suitable lugs 150 depending down from the underside of the platform H, and these side-strips have their ends farthest from said shaft engaged by a cross-bar 91, having a series of upwardly projecting fingers 92 that are adapted to engage and enter recesses 151 in the underside of the gearing of the cyclometer when the graduated dials thereof are in certain position indicating naught, substantially as will hereinafter be more fully described.

Immediately under the platform H, the spur-wheel shaft 51 is provided with a star-wheel 93, which is engaged by a suitable spring actuated pawl 94 pivoted to the underside of said platform, and immediately below the secondary platform 40, said shaft 51 is provided with a pinion 95 that engages a gear 96 on the lower end of a vertical shaft 97 journaled in the upper and secondary platform, substantially as shown in the drawings. Below the upper platform, shaft 97 is provided with a gear 98 of the same diameter as gear 96. Gear 98 engages drive-gear 99 on the lower end of the vertical spindle 100 extending below platform H in a plate 101 constituting part of a cyclometer frame in which it is journaled. The upper end of this spindle 100 is provided with a units dial 102 of a cyclometer the construction of which is made the subject-matter of Letters Patent of the United States, No. 879,379 of Sept. 1, 1908 and does not require further explanation herein.

Gear 96, (below and alining with gear 98, Fig. 12) which derives motion from the pinion 95 on the spur-wheel shaft, engages a gear on the lower end of the spindle of the units dial 126 of a cyclometer, which is constructed in every substantial respect similar to the cyclometer hereinbefore described excepting that it is secured to the edge of the secondary platform immediately under said first mentioned cyclometer and for this reason the details of the same have not been illustrated as they would be substantially identical with those of Fig. 12. However it might be added that the cyclometers work in unison with each other as they are both actuated from one and the same shaft. The only difference between the upper cyclometer and the lower cyclometer, aside from the differences which have been alluded to, is that the numerals on the digit dials or wheels of the lower cyclometer are arranged and read in the opposite direction from the numerals on the dials of the lower cyclometer; thus by arranging the dials of the upper cyclometer (Fig. 1) so that the numerals exposed in the openings in plate 121 thereof will indicate the number of coins it is desired to count, each coin passing by the spur-wheel will subtract one from the number which the operator has set the dials, and when the number of coins passing the spur-wheel equal the number of coins at which the upper cyclometer has been set, the dials will turn so that only the naughts thereon will show, the fingers 92 of the cross-bar 91, as hereinbefore stated, will move upward and engage the recesses in the dials of the upper cyclometer, and the frame Q, of which said cross-bar 91 forms a part, will move so that the trip-lever P will automatically release lever L, and automatically throw the upper clutch member M on the drive-shaft, out of engagement with the lower clutch member N and stop the further operation of the machine.

My improved machine is capable of selecting and counting coins of a certain value from many mixed coins of different values placed in the magazine. This I accomplish by rabbeting the outer edges $d$ of the trays 16 of the revolving bottom, and by providing the rear edges of said trays about midway between the inner edges with a slightly projecting stud $e$. Some device must be used which will reject or remove the undesirable coin from the tray before the latter reaches such a position that it will fall backward and dump its load into the revolving hopper. This I accomplish by means of a stripping-blade $f$, and, if that should prove ineffective, an upsetting-arm $f'$. The body of the stripping-blade extends obliquely across the edge of the rim 9 of the backframe of the magazine near its uppermost segment and its outer extremity is hooked downward and pivotally connected to the rear marginal surface of said rim. Near its opposite end it is provided with a downward tongue $f^2$ which laps down in front of the marginal portion of said rim over the rabbeted edge of the trays, more or less. The extent the said tongue laps over said rabbeted edges is determined by raising or lowering the adjacent end of the blade, and this is done by means of an arm $f^3$, which projects from a suitable boss $f^4$, and has its free end extend transversely through the adjacent bifurcated end of blade $f$. Boss $f^4$ is the head of a bolt, the barrel of which is journaled in suitable bearings made in a bracket $k$ at about its center of length, and it extends through a straight arm $j$ about its center of length, and holds it in any position desired by clamping it against the side of the bracket and by tightening the nut $j'$ on its screw-threaded end. Bracket $k$ is secured to the back of the rim 9 in any suitable manner and extends out over the magazine a suitable distance, and arm $j$ is of such length and its pivot is so located that its extremity just reaches and permits the trays to move under it. The opposite end of this arm $j$ is pointed and is intended to indicate graduations made in the contiguous side of the outer end of the bracket which are indicated by the letter "D" for dimes, by the letter "P" for pennies, and by the letter "N" for nickels. By moving this arm $j$ so that its index will point to the graduations marked "D", the stripper-blade will be moved so that its tongue will eject all coins excepting dimes, from the trays before they reach the point where they are deposited in the revolving hopper. After the dimes have been all removed from the mass of coins in the magazine, the index arm can be moved so as to indicate the graduation marked "P", and thereupon the said blade will proceed to select all the pennies from the mass of coins in the magazine and exclude all larger coins, and by moving the said arm so as to indicate the graduation marked "N", the machine will proceed to elevate and count the nickels. While the selection of these various coins is perfectly practicable, it is customary to deposit in the magazine only coins of a certain denomination, or coins largely consisting of coins of a given value. Arm $j$ may be provided with an extension $o$ which extends in the opposite direction from the index arm, and the end of this extension terminates and is so shaped that, when the branch of arm $j$ is set so that the stripper-blade ejects coins larger than that which it is desired to count, the end of the opposite branch of said arm will assist the action of the stripper-blade, and sweep the larger coins from the trays should they pass under the tongue of the stripper-blade and continue to adhere to the trays.

If desired the lower swinging-chute 43 with the spring-arms 50 may be omitted or removed from the upper stationary portion of the chute I in the manner hereinbefore described and a similar chute, 43ˣ, from which said spring-arms 50 and arm 71 is removed may be substituted therefor, as shown in Figs. 19 and 20, and instead of the coins discharging into cartons they may be deposited in a bag. I have, therefore, provided a bag-holder which comprises a standard made of sheet metal of suitable thickness and consists of a flat plate 136 the lower end of which terminates in suitable legs 137, which latter are provided with inwardly projecting dowels 138, adjacent to their lower ends, that are adapted to enter holes in the outer edges of the base-plate. The upper end of plate 136 extends upward toward the center of the machine and its upper portion is bent horizontally and laps over the edge of the secondary-platform, where a dowel 140 projecting therefrom enters a suitable opening made therefor in said platform alongside of the upper end of the shifting-frame 56. Just above its legs this plate 136 is provided with a forwardly projecting yoke or loop 141 of metal, within whose embrace the upper end of a scoop-shaped chute 142 is secured. The part of this loop bridging the outer substantially parallel edges of the chute 142 is provided with a vertical somewhat wedge shaped extension, and to the upper portion of this extension a clamping-plate 143, of substantially the same contour, is secured by means of a thumb-screw 144, substantially as shown. In order to secure the bag to this chute, the chute is inserted in the mouth of the same, and then the edges of the bag are drawn tight around the upper edge of the chute, and the forward portion of said edges folded back upon itself and clamped between the lower edge of the clamping-plate 143, and the forward portion of the yoke or loop, by tightening thumb-screw 144. The bag can be as easily removed from this holder or can be easily mounted in place or removed from the machine, whenever desired.

What I claim as new is:—

1. In a coin counting machine, a magazine having a revolvable bottom, hinged automatic means for removing coin therefrom one at a time, counting mechanism, and a bodily revolvable hopper adapted to receive the coin direct from the magazine and convey the same past the counting mechanism to the point of discharge of the machine.

2. In a coin counting machine, a magazine having a revolvable bottom, hinged automatic means for removing the coin therefrom one at a time, counting mechanism, and a bodily revolvable hopper constructed to receive said coin direct from the magazine and carry the same on edge past the counting mechanism to the point of discharge of the machine.

3. In a coin counting machine, a magazine having a revolvable bottom, hinged automatic means for removing the coin therefrom one at a time, and a bodily revolvable hopper having a concentrically arranged series of pockets adapted to receive said coin direct from the magazine and convey the same to the point of discharge of the machine.

4. In a coin counting machine, a magazine having a revolvable bottom, hinged automatic means for removing the coin therefrom one at a time, and a bodily revolvable hopper having a concentrically arranged series of pockets constructed to receive said coin direct from the magazine and carry the same one at a time to the point of discharge of the machine.

5. In a coin counting machine, a magazine having a revolvable bottom, hinged means for removing coin therefrom, one at a time, a cyclometer, and a bodily revolvable hopper adapted to receive the coin direct from the magazine and convey the same past the actuating member of said cyclometer to the point of discharge of the machine.

6. In a coin counting machine, a magazine having a revolvable bottom, hinged means for removing coin therefrom one at a time, two simultaneously operating cyclometers, and a bodily revolvable hopper adapted to receive the coin direct from the magazine and convey the same into engagement with the actuating members of said cyclometers.

7. In a coin counting machine, a magazine having a revolvable bottom, hinged means for removing the coin therefrom one at a time, a cyclometer, and a bodily revolvable hopper having a concentrically arranged series of pockets, adapted to receive the coin direct from the magazine and convey the same into engagement with the actuating member of said cyclometer.

8. In a coin counting machine, a magazine having a revolvable bottom, hinged means for removing coin therefrom one at a time, two cyclometers, and a bodily revolvable hopper having a concentrically arranged series of pockets, adapted to receive the coin direct from the magazine and convey the same into engagement with the actuating elements of said cyclometers.

9. In a coin counting machine, a magazine having an inclined revolvable bottom, hinged automatic means for removing coin therefrom one at a time, counting mechanism, and a bodily revolvable hopper adapted to receive the coin direct from the magazine and convey the same past the counting mechanism to the point of discharge of the machine.

10. In a coin counting machine, a magazine having a revolvable bottom, hinged automatic means for removing coin therefrom one at a time, counting mechanism, and a bodily revolvable hopper adapted to receive the coin direct from the magazine and convey the same past the counting mechanism to the point of discharge of the machine.

11. In a coin counting machine a magazine having a revolvable inclined bottom and stationary side walls, hinged automatic means for removing the coin therefrom one at a time, counting mechanism, and a bodily revolvable hopper adapted to receive the coin direct from the magazine and convey the same past the counting mechanism to the point of discharge of the machine.

12. In a coin counting machine, a magazine having a revolvable bottom, a hinged marginal series of coin trays, automatic means for removing coin therefrom one at a time, and a bodily revolvable hopper adapted to receive the coin direct from the magazine and convey the same to the point of discharge of the machine.

13. In a coin counting machine, a magazine having a revolvable bottom, a hinged marginal series of coin trays hinged to the circumferential edge of the same, automatic means for removing coin therefrom one at a time, and a bodily revolvable hopper adapted to receive the coin and convey the same to the point of discharge of the machine.

14. In a coin counting machine, a magazine having a revolvable inclined bottom, a hinged marginal series of coin trays, automatic means for removing the coin therefrom one at a time, and a bodily revolvable hopper adapted to receive the coin direct from the magazine and convey the same to the point of discharge of the machine.

15. In a coin counting machine, a magazine having an inclined revolvable bottom, hinged automatic means for removing the coin therefrom one at a time, and a bodily revolvable hopper constructed to receive said coin direct from the magazine and carry the same on edge to the point of discharge of the machine.

16. In a coin counting machine, a magazine having a revolvable bottom, hinged automatic means for removing the coin therefrom one at a time, and a bodily revolvable hopper constructed to receive said coin direct from the magazine and carry the same on edge to the point of discharge of the machine.

17. In a coin counting machine, a magazine having a revolvable inclined bottom and stationary side walls, hinged automatic means for removing the coin therefrom one at a time, and a bodily revolvable hopper constructed to receive said coin direct from the magazine and carry the same on edge to the point of discharge of the machine.

18. In a coin counting machine, a magazine having a revolvable bottom, a hinged marginal series of coin trays, automatic means for removing the coin therefrom one at a time, and a bodily revolvable hopper constructed to receive said coin direct from the magazine and carry the same on edge to the point of discharge of the machine.

19. In a coin counting machine, a magazine having a revolvable bottom, a marginal series of coin trays hinged to the circumferential edge of the same, automatic means for removing the coin therefrom one at a time, and a revolvable hopper constructed to receive said coin from the magazine and carry the same on edge to the point of discharge of the machine.

20. In a coin counting machine, a magazine having a revolvable inclined bottom, a hinged marginal series of coin trays, automatic means for removing the coin therefrom one at a time, and a bodily revolvable hopper constructed to receive said coin direct from the magazine and carry the same on edge to the point of discharge of the machine.

21. In a coin counting machine, a magazine having a revolvable bottom, hinged automatic means for removing the coin therefrom one at a time, and a bodily revolvable hopper having a concentrically arranged series of pockets adapted to receive said coin direct from the magazine and convey the same to the point of discharge of the machine.

22. In a coin counting machine, a magazine having a revolvable inclined bottom, hinged automatic means for removing the coin therefrom one at a time, and a bodily revolvable hopper having a concentrically arranged series of pockets adapted to receive said coin direct from the magazine and convey the same to the point of discharge of the machine.

23. In a coin counting machine, a magazine having a revolvable inclined bottom and stationary side walls, hinged automatic means for removing the coin therefrom one at a time, and a bodily revolvable hopper having a concentrically arranged series of pockets adapted to receive said coin direct from the magazine and convey the same to the point of discharge of the machine.

24. In a coin counting machine, a magazine having a revolvable bottom, a hinged marginal series of coin trays, automatic means for removing the coin therefrom one at a time, and a bodily revolvable hopper having a concentrically arranged series of pockets adapted to receive said coin direct from the magazine and convey the same to the point of discharge of the machine.

25. In a coin counting machine, a magazine having a revolvable bottom, a marginal series of coin trays hinged to the circumferential edge of the same, automatic means for removing the coin therefrom one at a time, and a revolvable hopper having a concentrically arranged series of pockets adapted to receive said coin and convey the same to the point of discharge of the machine.

26. In a coin counting machine, a magazine having a revolvable inclined bottom, a hinged marginal series of coin trays, automatic means for removing the coin therefrom one at a time, and a bodily revolvable hopper having a concentrically arranged series of pockets adapted to receive said coin direct from the magazine and convey the same to the point of discharge of the machine.

27. In a coin counting machine, a magazine having a revolvable bottom, hinged automatic means for removing the coin therefrom one at a time, and a bodily revolvable hopper having a concentrically arranged series of pockets constructed to receive said coin direct from the magazine and carry the same one at a time to the point of discharge of the machine.

28. In a coin counting machine, a magazine having a revolvable inclined bottom, hinged automatic means for removing the coin therefrom one at a time, and a bodily revolvable hopper having a concentrically arranged series of pockets constructed to receive said coin direct from the magazine and carry the same one at a time to the point of discharge of the machine.

29. In a coin counting machine, a magazine having a revolvable inclined bottom and stationary side walls, hinged automatic means for removing the coin therefrom one at a time, and a bodily revolvable hopper having a concentrically arranged series of pockets constructed to receive said coin direct from the magazine and carry the same one at a time to the point of discharge of the machine.

30. In a coin counting machine, a magazine having a revolvable bottom, a hinged marginal series of coin trays, automatic means for removing the coin therefrom one at a time, and a bodily revolvable hopper having a concentrically arranged series of pockets constructed to receive said coin direct from the magazine and carry the same one at a time to the point of discharge of the machine.

31. In a coin counting machine, a magazine, a revolvable bottom therefor, a marginal series of coin trays hinged to the circumferential edge of the same, automatic means for removing the coin therefrom one at a time, and a revolvable hopper having a concentrically arranged series of pockets constructed to receive said coin and carry the same one at a time to the point of discharge of the machine.

32. In a coin counting machine, a magazine having a revolvable inclined bottom, a hinged marginal series of coin trays, automatic means for removing the coin therefrom one at a time, and a bodily revolvable hopper having a concentrically arranged series of pockets constructed to receive said coin direct from the magazine and carry the same one at a time to the point of discharge of the machine.

33. In a coin counting machine, a magazine having an inclined bottom, hinged means for removing the coin therefrom one at a time, a cyclometer, and a bodily revolvable hopper adapted to receive the coin direct from the magazine and convey the same past the actuating member of said cyclometer to the point of discharge of the machine.

34. In a coin counting machine, a magazine having a revolvable inclined bottom, hinged means for removing the coin therefrom one at a time, a cyclometer, and a bodily revolvable hopper adapted to receive the coin direct from the magazine and convey the same past the actuating member of said cyclometer to the point of discharge of the machine.

35. In a coin counting machine, a magazine having a revolvable inclined bottom and stationary side walls, hinged means for removing coin therefrom one at a time, a cyclometer, and a bodily revolvable hopper adapted to receive the coin direct from the magazine and convey the same past the actuating member of said cyclometer to the point of discharge of the machine.

36. In a coin counting machine, a magazine having a revolvable bottom, a hinged marginal series of coin trays, means for removing coin therefrom one at a time, a cyclometer, and a bodily revolvable hopper adapted to receive the coin direct from the magazine and convey the same into engagement with the actuating member of said cyclometer.

37. In a coin counting machine, a magazine having a revolvable bottom, a marginal series of coin trays hinged to the circumferential edge of the same, means for removing coin therefrom one at a time, a cyclometer, and a bodily revolvable hopper adapted to receive the coin and convey the same into engagement with the actuating member of said cyclometer.

38. In a coin counting machine, a magazine having a revolvable inclined bottom, a hinged marginal series of coin trays, means for removing coin therefrom one at a time, a cyclometer, and a revolvable hopper adapted to receive the coin direct from the magazine and convey the same into engagement with the actuating member of said cyclometer.

39. In a coin counting machine, a magazine having a revolvable bottom, hinged means for removing coin therefrom one at a time, two cyclometers, and a revolvable hopper adapted to receive the coin and convey the same into engagement with the actuating members of said cyclometers.

40. In a coin counting machine, a magazine having a revolvable inclined bottom, hinged means for removing coin therefrom one at a time, two cyclometers, and a revolvable hopper adapted to receive the coin and convey the same into engagement with the actuating members of said cyclometers.

41. In a coin counting machine, a magazine having a revolvable inclined bottom and stationary side walls, hinged means for removing coin therefrom one at a time, two cyclometers, and a revolvable hopper adapted to receive the coin and convey the same into engagement with the actuating members of said cyclometers.

42. In a coin counting machine, a magazine having a revolvable bottom, a hinged marginal series of coin trays, means for removing coin therefrom one at a time, two cyclometers, and a revolvable hopper adapted to receive the coin and convey the same into engagement with the actuating members of said cyclometers.

43. In a coin counting machine, a magazine having a revolvable bottom, a hinged marginal series of coin trays hinged to the circumferential edge of the same, means for removing coin therefrom one at a time, two cyclometers, and a revolvable hopper adapted to receive the coin and convey the same into engagement with the actuating members of said cyclometers.

44. In a coin counting machine, a magazine having a revolvable inclined bottom, a hinged marginal series of coin trays, means for removing coin therefrom one at a time, two cyclometers, and a revolvable hopper adapted to receive the coin and convey the same into engagement with the actuating members of said cyclometers.

45. In a coin counting machine, a magazine having a revolvable bottom, laterally movable marginal means for removing the coin therefrom one at a time, a cyclometer, and a bodily revolvable hopper having a concentrically arranged series of pockets adapted to receive the coin and convey the same into engagement with the actuating member of said cyclometer.

46. In a coin counting machine, a magazine having a revolvable inclined bottom, laterally movable marginal means for removing the coin therefrom one at a time, a cyclometer, and a body revolvable hopper having a concentrically arranged series of pockets adapted to receive the coin and convey the same into engagement with the actuating member of said cyclometer.

47. In a coin counting machine, a magazine having a revolvable bottom, a marginal series of laterally movable coin trays, means for removing the coin therefrom one at a time, a cyclometer, and a bodily revolvable hopper having a concentrically arranged series of pockets adapted to receive the coin and convey the same into engagement with the actuating member of said cyclometer.

48. In a coin counting machine, a magazine having a revolvable bottom, a marginal series of coin trays hinged to the circumferential edge of the same, means for removing the coin therefrom one at a time, a cyclometer, and a revolvable hopper having a concentrically arranged series of pockets adapted to receive the coin and convey the same into engagement with the actuating member of said cyclometer.

49. In a coin counting machine, a magazine having a revolvable inclined bottom, a marginal series of laterally movable coin trays, means for removing the coin therefrom one at a time, a cyclometer, and a bodily revolvable hopper having a concentrically arranged series of pockets adapted to receive the coin and convey the same into engagement with the actuating member of said cyclometer.

50. In a coin counting machine, a suitable magazine, a revolving bottom therefor, adapted to discharge the coin therefrom one at a time, a revolving hopper having a series of circumferential pockets provided with circumferentially elongated openings, a platform just above which said hopper revolves, means for inclining the coins in said pockets obliquely to the line of travel, and a cyclometer actuated by said coins.

51. In a coin counting machine, a suitable magazine, a revolving bottom therefor adapted to discharge the coin therefrom one at a time, a revolving hopper having a series of circumferential pockets provided with circumferentially elongated openings, a platform just above which said hopper revolves, a segmental guard extending outside of the line of travel of the coin from the point where it is received by the pockets of the hopper to the cyclometer and said cyclometer actuated by said coin.

52. In a coin counting machine, a suitable magazine, a revolving bottom therefor adapted to discharge the coin therefrom one at a time, a revolving hopper having a series of circumferential pockets provided with circumferentially elongated openings, a platform just above which said hopper revolves, means for moving the coins in said pocket obliquely to the line of travel, a segmental guard extending outside of the line of travel from the point where it is received by the pockets of the hopper to the cyclometer and said cyclometer actuated by said coin.

53. In a coin counting machine a suitable magazine, a revolving bottom therefor adapted to discharge the coin therefrom one at a time, a revolving hopper having a series of circumferential pockets provided with circumferentially elongated openings, a platform just above which said hopper revolves having a discharge slot therein, a housing provided with a passage disposed above and parallel to said discharge slot, means for moving the coins in said pockets obliquely to the line of travel, and a cyclometer actuated by the coin in said pockets.

54. In a coin counting machine, a suitable magazine, a revolving bottom therefor adapted to discharge the coin therefrom one at a time, a revolving hopper having a series of circumferential pockets provided with circumferentially elongated openings, a platform just above which said hopper revolves having a discharge slot therein, a housing provided with a passage disposed above and parallel to said discharge slot, a segmental guard extending outside of the line of travel of the coin from the point where it is received by the pockets of the hopper to the cyclometer and said cyclometer actuated by the coin in said pockets.

55. In a coin counting machine, a suitable magazine, a revolving bottom therefor adapted to discharge the coin therefrom one at a time, a revolving hopper having a series of circumferential pockets provided with circumferentially elongated openings, a platform just above which said hopper revolves having a discharge slot therein, a housing provided with a passage disposed above and parallel to said discharge slot, means for moving the coins in said pockets obliquely to the line of travel, a segmental guard extending outside of the line of travel of the coin from the point where it is received by the pockets of the hopper to the cyclometer and said cyclometer actuated by said coin.

56. A coin counting machine comprising a magazine, a revolvable hopper, a discharge chute, and automatic means for momentarily stopping the passage of coin through said chute at predetermined points whereby several coins are temporarily held.

57. A coin counting machine comprising means for separating and counting the coin one at a time, a discharge chute, and automatic devices for momentarily obstructing the passage of coin through said chute at predetermined points whereby several coins are temporarily held, and means for controlling the moment of operation of said obstructing devices.

58. A coin counting machine comprising means for separating and counting the coin one at a time, a series of cartons having a progressive movement, and a discharge chute consisting of a stationary upper part and a lower part hinged at its upper end to said upper part adapted to move with a carton until it has received a predetermined number of coins.

59. A coin counting machine comprising means for separating and counting the coin one at a time, a series of cartons having a progressive movement, and a discharge chute consisting of a stationary upper part, and a removable lower part adapted to move with a carton until it has received a predetermined number of coins.

60. A coin counting machine comprising means for separating and counting the coin one at a time, a discharge chute having a laterally movable lower portion, a revolving carrier, means for carrying cartons thereon the upper mouths of which receive in transit the discharge from said chute which latter moves with one of said cartons until it has received a predetermined number of coins.

61. A coin counting machine comprising means for separating and counting the coin one at a time, a revolving carrier, means for carrying cartons thereon, and a discharge chute for receiving said coin when counted the lower portion of which follows and discharges into the mouths of said cartons in transit below the same until a predetermined number of coins is deposited therein.

62. A coin counting machine comprising means for separating and counting the coin one at a time, a revolving carrier, means for carrying cartons thereon, and a discharge chute for receiving said coin when counted which has an automatically returnable lower portion that follows and discharges into the mouths of said cartons in transit below the same until a predetermined number of coin is deposited therein.

63. A coin counting machine comprising a discharge chute the lower portion of which is hinged to the upper portion and has spring arms extending below its lower end, a circular carrier revolvable under said chute, means on said carrier for holding cartons whose upper ends are engaged by said arms.

64. A coin counting machine comprising a discharge chute the lower portion of which is hinged to the upper portion, a circular carrier revolvable under said chute, a series of holders on said carrier in which cartons are placed, and means for causing the lower portion of said chute to keep pace with the carton into which it is discharging for a stated period of time, and quickly returning it to its original position.

65. A coin counting machine comprising a discharge chute, the lower portion of which is hinged to the upper portion, a series of holders in which said cartons are placed having a processional movement under said chute, an arm projecting downward from said chute and a horizontally disposed arm engaging said first mentioned arm for moving the lower portion of said chute apace with the carton into which it is discharging for a limited distance, and permitting it to automatically return to its original position.

66. A coin counting machine comprising a discharge chute, a series of carton holders having a processional movement, and means for vibrating the cartons contained therein.

67. A coin counting machine comprising a discharge chute, a series of carton holders having a processional movement, and means for vibrating the cartons contained therein while in transit under said chute.

68. A coin counting machine comprising a discharge chute, a series of carton holders having a processional movement, and a false bottom in each of said holders for vibrating the cartons contained therein.

69. A coin counting machine comprising a discharge chute, a series of carton holders having a processional movement, a false bottom in each of said holders for vibrating the cartons contained therein, and a radially disposed lever fulcrumed mediate its ends and engaging said false bottom.

70. A coin counting machine comprising a discharge-chute into which coins are continuously fed and having a transverse opening therein, and a device adapted to periodically enter said openings and momentarily retard the passage of coin through said chute and then automatically release the same.

71. A coin counting machine comprising a discharge-chute and means adapted to stop the passage of coin through said chute at predetermined points whereby several coins are momentarily retarded, and devices that automatically release said means to continue the passage of coin through said chute.

72. A coin counting machine comprising a chute having an upper stationary section, and a lower section having a laterally pendulous movement and detachably connected to said upper section.

73. A coin counting machine comprising a chute having an upper stationary section and an automatically returnable lower section having a laterally pendulous movement and detachably connected to said upper section.

74. In a coin counting machine a series of carton holders having a processional movement, a discharge-chute comprising an upper stationary section, and an automatically returnable lower section which swings laterally from and whose upper end is secured to said upper section, and means for momentarily retarding the fall of coin through said upper section synchronously with the return of said lower section to its original position.

75. In a coin counting machine an endless series of carton holders having a processional movement, a discharge-chute comprising an upper stationary section, and an automatically returnable lower section which swings laterally from and whose upper end is secured to said upper section, and means for momentarily retarding the fall of coin through said upper section synchronously with the return of said lower section to its original position.

76. In a coin counting machine a series of carton holders having a processional movement, a discharge-chute comprising an upper stationary section having a transverse opening therein, and an automatically returnable lower section which swings laterally from and whose upper end is secured to said upper section, and an automatically returnable arm the extremity of which enters said opening, for momentarily retarding the fall of coin through said upper section synchronously with the return of said lower section to its original position.

77. In a coin counting machine, an intermittently revolving carrier, and a series of carton holders secured thereto in combination with a discharge-chute comprising an upper stationary section and a lower section hinged to the lower end thereof so as to be capable of swinging laterally for a limited distance, spring-arm extending down from said lower section and adapted to engage the upper end of the carton projecting above the holder, and means for predetermining the number of coin falling into said engaged carton.

78. In a coin counting machine, an intermittently revolving carrier, and a series of carton holders secured thereto in combination with a discharge-chute comprising an upper stationary section and a lower section hinged to the lower end thereof so as to be capable of swinging laterally for a limited distance, spring-arm extending down from said lower section and adapted to engage the upper end of the carton projecting above the holder, means for predetermining the number of coin falling into said engaged carton and mechanism for automatically returning said lower section to its original position.

79. In a coin counting machine an intermittently revolving carrier, and a series of carton holders secured thereto, in combination with a discharge chute the lower end of which keeps pace for a limited distance with said carrier, and means for predetermining the number of coin that will fall into each carton in transit under said chute.

80. In a coin counting machine the combination with an intermittently revolving carrier, and a series of carton holders secured thereto, of means for counting said coin one at a time, a discharge-chute the lower end of which keeps pace for a limited distance with said carrier, and mechanism actuated by said counting means for automatically returning said discharge chute to its original position when a predetermined number of coin shall have been deposited in the carton last engaged thereby.

81. A coin counting machine comprising mechanism for separating and discharging coin one at a time, an intermittently rotatable wheel engaged and actuated by each coin, a cyclometer engaged by said wheel for counting said discharged coin, another cyclometer representing the number of coin it is desired to count and subtracting from that number as said coins are discharged one by one and mechanism for packaging said discharged coin.

82. A coin counting machine comprising mechanism for separating and discharging coin one at a time, an intermittently rotatable wheel engaged and actuated by each coin, a cyclometer engaged by said wheel for counting said discharged coin, another cyclometer representing the number of coin it is desired to count and subtracting from that number as said coins are discharged one by one, mechanism for packaging said discharged coin, and means for automatically stopping the operation of the machine when the predetermined number of coin shall have been counted.

83. A coin counting machine comprising mechanism for separating and discharging coin, a discharge-chute, having a lower pendulous end, means for temporarily retarding the passage of coin through said chute, a series of carton-holders having a processional movement under said chute, and a cam actuating said retarding devices and the pendulous end of the chute.

84. A coin counting machine comprising a motor, a drive-shaft having a part actuated thereby and an alining part, a clutch for imparting the motion of the former to the latter, mechanism for separating and discharging coins, a cyclometer set to represent the number of coins it is desired to count, and means engaging and automatically stopping said cyclometer, and simultaneously shifting said clutch to disengage the parts of the drive-shaft.

85. A coin counting machine comprising a motor, a drive-shaft having a part actuated thereby and an alining part, a clutch for imparting the motion of the former to the latter, mechanism for separating and discharging coins, a cyclometer set to represent the number of coins it is desired to count, and means engaging and automatically stopping said cyclometer and simultaneously shifting said clutch to disengage the parts of the drive-shaft and stop said motor.

In testimony whereof I have hereunto set my hand and seal this 28th day of March, A. D., 1908.

CHARLES L. LILLEBERG. [L. S.]

Witnesses:
   FRANK D. THOMASON,
   E. K. LUNDY.